(12) United States Patent
Huang

(10) Patent No.: US 11,543,318 B2
(45) Date of Patent: Jan. 3, 2023

(54) PRESSURE MEASURING INSTRUMENT

(71) Applicant: ZHONGSHAN FUMAO SEALS-TECH CO., LTD., Zhongshan (CN)

(72) Inventor: Chang-Ching Huang, Zhongshan (CN)

(73) Assignee: ZHONGSHAN FUMAO SEALS-TECH CO., LTD., Zhongshan (CN)

( * ) Notice: Subject to any disclaimer, the term of this patent is extended or adjusted under 35 U.S.C. 154(b) by 26 days.

(21) Appl. No.: 17/408,477

(22) Filed: Aug. 22, 2021

(65) Prior Publication Data

US 2022/0373421 A1 Nov. 24, 2022

(30) Foreign Application Priority Data

May 21, 2021 (CN) .......................... 202110556997.9

(51) Int. Cl.
| | |
|---|---|
| *G01L 19/10* | (2006.01) |
| *G01L 19/14* | (2006.01) |
| *G01L 19/06* | (2006.01) |
| *F16L 41/00* | (2006.01) |
| *G01L 19/00* | (2006.01) |

(52) U.S. Cl.
CPC ............ *G01L 19/10* (2013.01); *F16L 41/008* (2013.01); *G01L 19/0007* (2013.01); *G01L 19/0672* (2013.01); *G01L 19/147* (2013.01)

(58) Field of Classification Search
CPC . G01L 19/10; G01L 19/0007; G01L 19/0672; G01L 19/147; F16L 41/008
See application file for complete search history.

(56) References Cited

U.S. PATENT DOCUMENTS

2015/0185097 A1* 7/2015 Huang ...................... G01L 7/08
73/715

FOREIGN PATENT DOCUMENTS

| KR | 200165909 Y1 * | 1/2000 |
| KR | 20010074590 A * | 8/2001 |

* cited by examiner

*Primary Examiner* — Ryan D Walsh

(57) ABSTRACT

The present disclosure provides a pressure measuring instrument which comprises a gauge body, a connecting component and a pushing component, the connecting component comprises a first connecting member and a positioning sleeve which are connected with each other to form a corotating relationship, and the first connecting member comprises a first external thread section and a second external thread section connected to each other, and the first external thread section is used for a pressure-measuring hole threaded with a pressure vessel, the second external thread section protrudes from the pressure-measuring hole, the positioning sleeve is rotatably screwed to the second external thread section, and the positioning sleeve is configured to provide a force to the pressure vessel, and the pushing component is configured to pass through the connecting component and be pushed by a fluid in the pressure-measuring hole to push against a pressurize unit of the gauge body.

17 Claims, 8 Drawing Sheets

PRESSURE MEASURING INSTRUMENT

TECHNICAL FIELD

The present disclosure relates to the technical field of pressure measurement, in particular to a pressure measuring instrument.

BACKGROUND

Pressure gauges are often used in pressure vessels such as gas cylinders, pipes, valve bodies, etc., to show pressure changes in the vessels in the form of numerical values, so that a user can monitor safety states, or know whether a fluid inside a vessel needs to be replenished, etc.; the pressure gauges are usually combined with the pressure vessels through screw connections, and have advantages of easy assembly and disassembly.

In actual application, however, the pressure gauges still have the following problems:

Regarding pressure-measuring holes drilled on the pressure vessels, internal threads of the pressure-measuring holes are often inaccurate due to poor construction precision, so that lengths of thread sections are not accurate enough, and surfaces of the pressure gauges and user's viewing directions are not align when the pressure gauges are screwed to their limit positions, the reading data error is large, and a whole arrangement of a device is disordered and irregular.

Therefore, it is necessary to provide a novel and progressive pressure measuring instrument to solve the above problems.

SUMMARY

Technical Problem

In view of the defects of the prior art, the present disclosure provides a pressure measuring instrument, which solves the problem that when a pressure gauge is screwed to a limit position, a surface of a pressure gauge and a viewing direction of a user are not align which affects a reading data since a length of a threaded section is not accurate due to a poor construction accuracy of a thread in a pressure-measuring hole on a pressure vessel.

Technical Solution

In order to achieve that above object, the present disclosure provides the following technical solution: a pressure measuring instrument for a pressure vessel comprising a pressure-measuring hole, a hole wall of the pressure-measuring hole being provided with a first screw connection section and a second screw connection section, and the first screw connection section being farther away from an opening of the pressure-measuring hole than the second screw connection section, wherein the pressure measuring instrument comprises a gauge body, a connecting component and a pushing component, the connecting component comprises a first connecting member and a positioning sleeve which are connected with each other to form a corotating relationship, and the first connecting member comprises a first external thread section and a second external thread section connected to each other, and the first external thread section is used for a pressure-measuring hole threaded with a pressure vessel, the second external thread section protrudes from the pressure-measuring hole, the positioning sleeve is rotatably screwed to the second external thread section, and the positioning sleeve is configured to provide a force to the pressure vessel, and the pushing component is configured to pass through the connecting component and be pushed by a fluid in the pressure-measuring hole to push against a pressurize unit of the gauge body.

Preferably, the gauge body comprises a pressurized unit and a rotating needle unit connected to each other in a couple relationship, and the pushing component is movably passed through the first connecting member to push the pressurized unit, and then the rotating needle unit rotates according to a pressure received by the pressurized unit.

Preferably, the connecting component further comprises a leakage-stopping member sleeved on the pushing component, and the leakage-stopping member laterally abuts against a hole wall of the pressure-measuring hole.

Preferably, one side of the leakage-stopping member is recessed with an annular groove for receiving the fluid of the pressure vessel, and an outer groove wall of the annular groove is stressed to be radially pressed against the hole wall of the pressure-measuring hole.

Preferably, the connecting component further comprises a supporting member, the supporting member and the leakage-stopping member are engaged with each other, and the supporting member provides an axial support force for the leakage-stopping member.

Preferably, a hardness of the supporting member is greater than a hardness of the leakage-stopping member.

Preferably, the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

Preferably, the connecting component further comprises a second connecting member which is screwed to a first screw connection section in the pressure-measuring hole of the pressure vessel, and the first connecting member is screwed to a second screw connection section in the pressure-measuring hole of the pressure vessel and connected to the gauge body.

Preferably, the second connecting member comprises a driving portion for allowing a manual tool assembled rod to penetrate into the pressure-measuring hole.

Preferably, an outer diameter of the first connecting member is larger than an outer diameter of the second connecting member.

Preferably, the pushing component comprises a head portion, a body portion and a tail portion connected to each other, the tail portion is configured to push against the pressurized unit, the body portion is configured to pass through the connecting component, and a radial size of the head portion is greater than a radial size of the body portion.

Preferably, the pushing component comprises a first pushing rod and a second pushing rod, and the second pushing rod is movably passed through the first connecting member to push the pressurized unit, and the first pushing rod is movably passed through the second connecting member to push the second pushing rod, and a portion of the first pushing rod protrudes from the second connecting member, and the first pushing rod comprises a head portion and a body portion connected to each other, the first pushing rod is configured to push the second pushing rod and push against the pressurized unit with the second pushing rod.

Advantageous Effects

The present disclosure provides a pressure measuring instrument which has the following advantageous effects:

1. With the help of the design of the positioning sleeve, a user can rotate the gauge body freely and accurately, and then adjust the surface to a desired position in order to observe and identify values.

2. The first connecting member separated from the second connecting member can effectively isolate a fluid in the pressure vessel and ensure that the first connecting member connected with the gauge body will not be pushed by the fluid in order to prevent the gauge body from detaching from the pressure vessel in a reverse direction.

Figure 1:
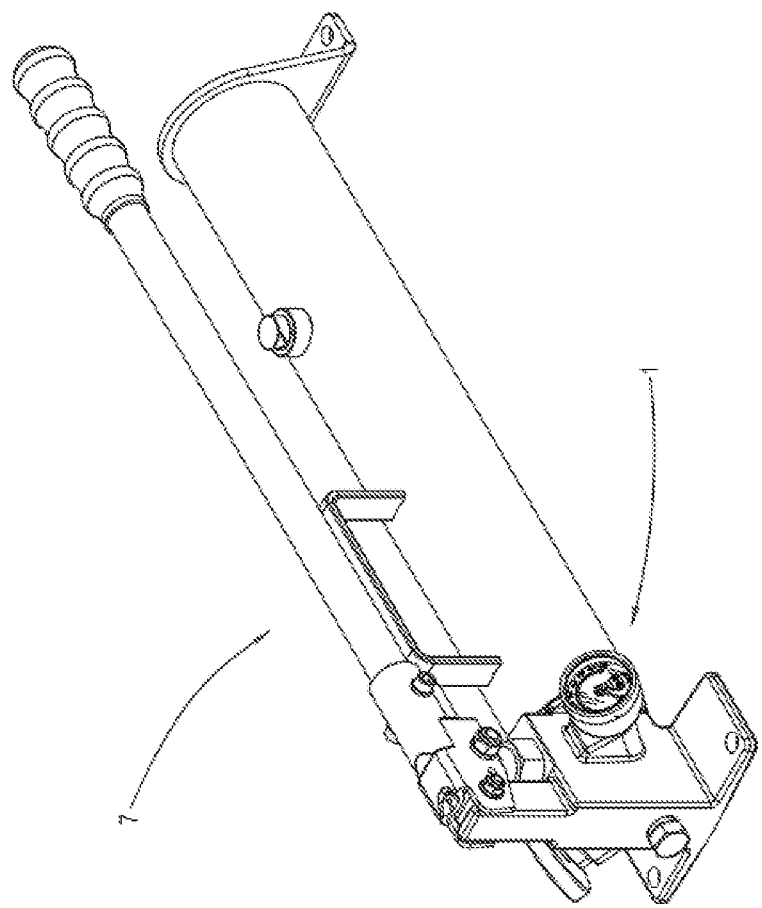
FIG. 1 is a perspective view of a whole structure of a pressure measuring instrument according to the present disclosure.

In which, 1, gauge body; 11, pressurized unit; 12, rotating needle unit; 2, connecting component; 21, first connecting member; 22, second connecting member; 211, first external thread section; 212, second external thread section; 213, third external thread section; 214, expansion section; 222, driving portion; 3, positioning sleeve; 4, leakage-stopping member; 41, annular groove; 42, outer groove wall; 5, supporting member; 6, pushing component; 61, head portion; 62, body portion; 63, tail portion; 600, first pushing rod; 601, second pushing rod; 7, pressure vessel; 71, pressure-measuring hole; 711, first screw connection section; 712, second screw connection section.

DESCRIPTION OF THE EMBODIMENTS

The technical solution in embodiments of the present disclosure will be clearly and completely described below in conjunction with the accompanying drawings in the embodiments of the present disclosure. It is obvious that the described embodiments are only a part of the embodiments of the present disclosure and not all of the embodiments. Based on the embodiments of the present disclosure, all other embodiments obtained by a person skilled in the art without creative labor fall within the scope of protection of the present disclosure.

In the description of the present disclosure, it should be noted that an orientation or positional relationship indicated by terms "center", "up", "down", "left", "right", "vertical", "horizontal", "inside", "outside" and the like is based on an orientation or positional relationship shown in the drawings, which is merely for ease of description of the disclosure and for simplification of the description, and is not intended to indicate or imply that the device or element referred to must have a particular orientation, be constructed and operated in a particular orientation, and is therefore not to be construed as limiting of the disclosure; the terms "first", "second" and "third" are for descriptive purposes only and are not to be construed as indicating or implying relative importance, and, in addition, unless expressly specified and limited otherwise, the terms "installed", "connected" and "connecting" are to be understood in a broad sense, for example, they may be a fixed connection, may be a detachable connection, may be a integral connection, may be a mechanical connection, may be an electrical connection; may be a direct connection, may be an indirect connection through an intermediate medium, or may be an internal connection of two elements. The specific meanings of the above-mentioned terms in the present disclosure can be specifically understood by a person skilled in the art.

Embodiment 1

Figure 2:
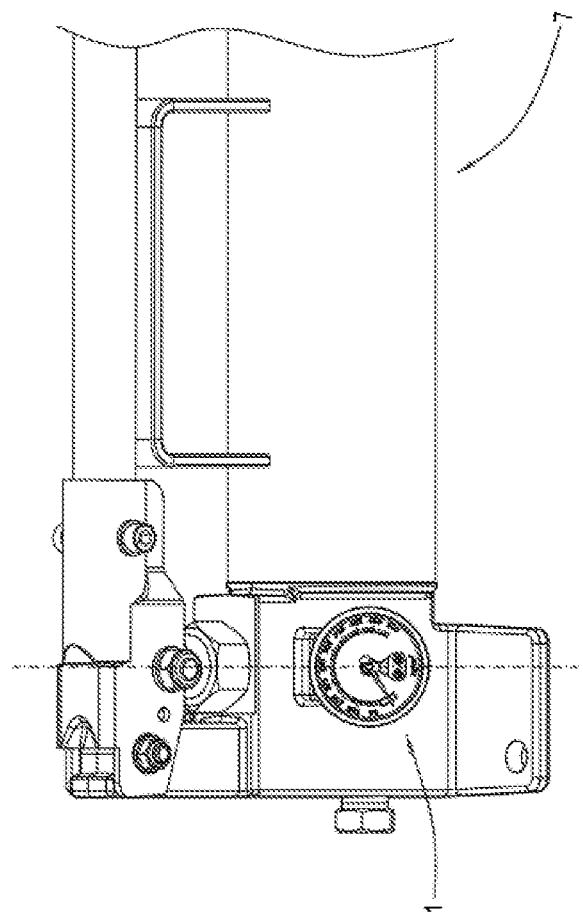
FIG. 2 is a front view of a whole structure of a pressure measuring instrument according to the present disclosure.
Figure 3:
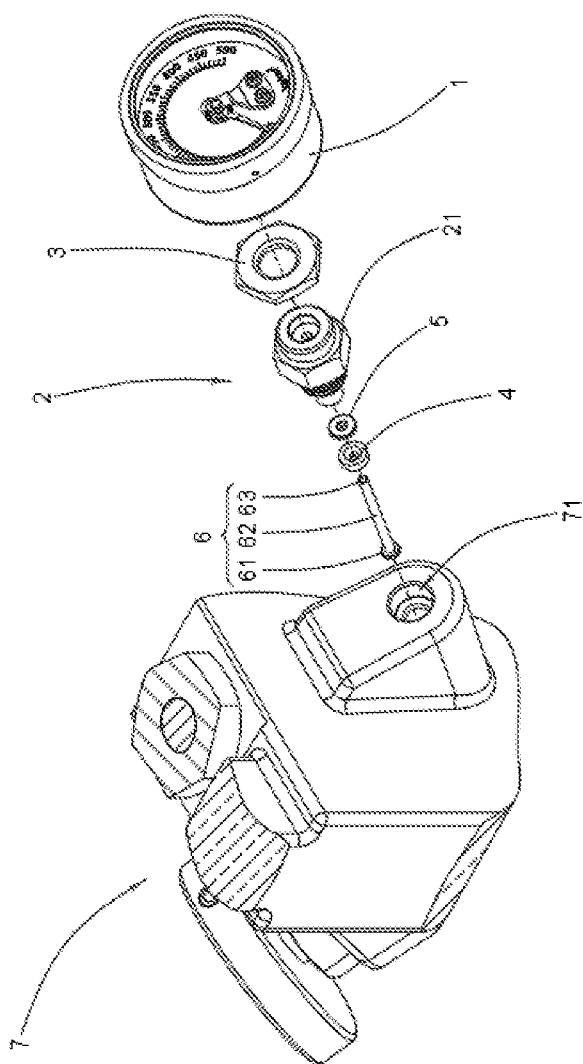
FIG. 3 is a structural perspective view of an embodiment of a pressure measuring instrument according to the present disclosure.
Figure 4:
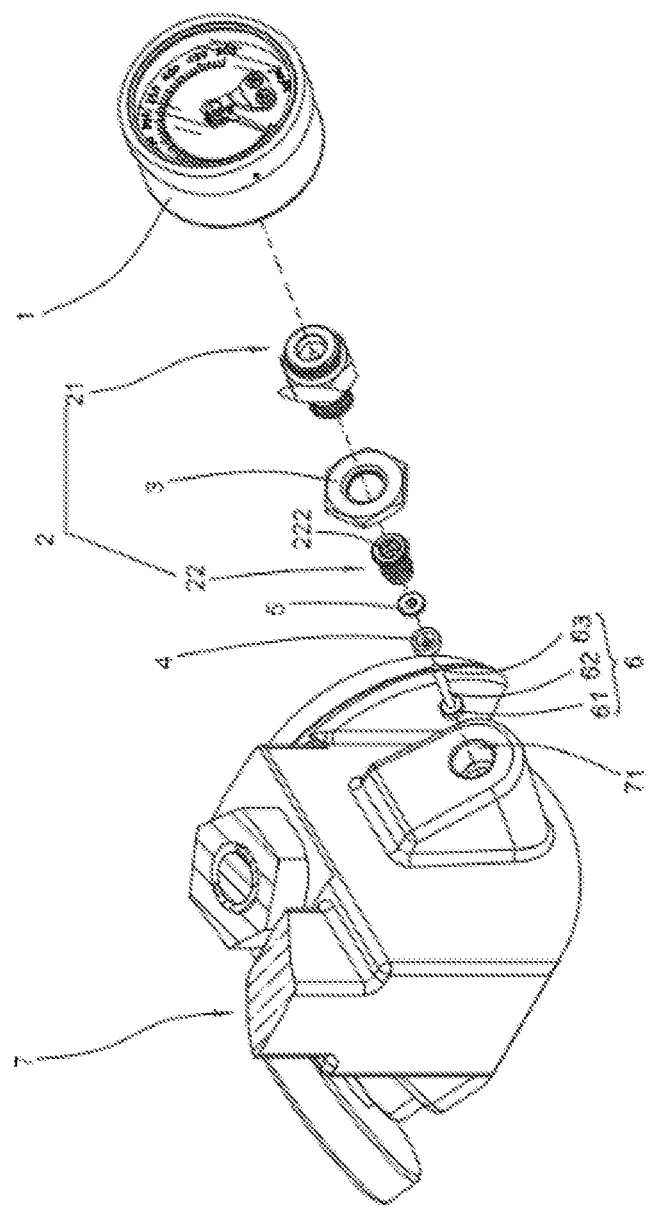
FIG. 4 is a structural perspective view of another embodiment of a pressure measuring instrument according to the present disclosure.
Figure 5:
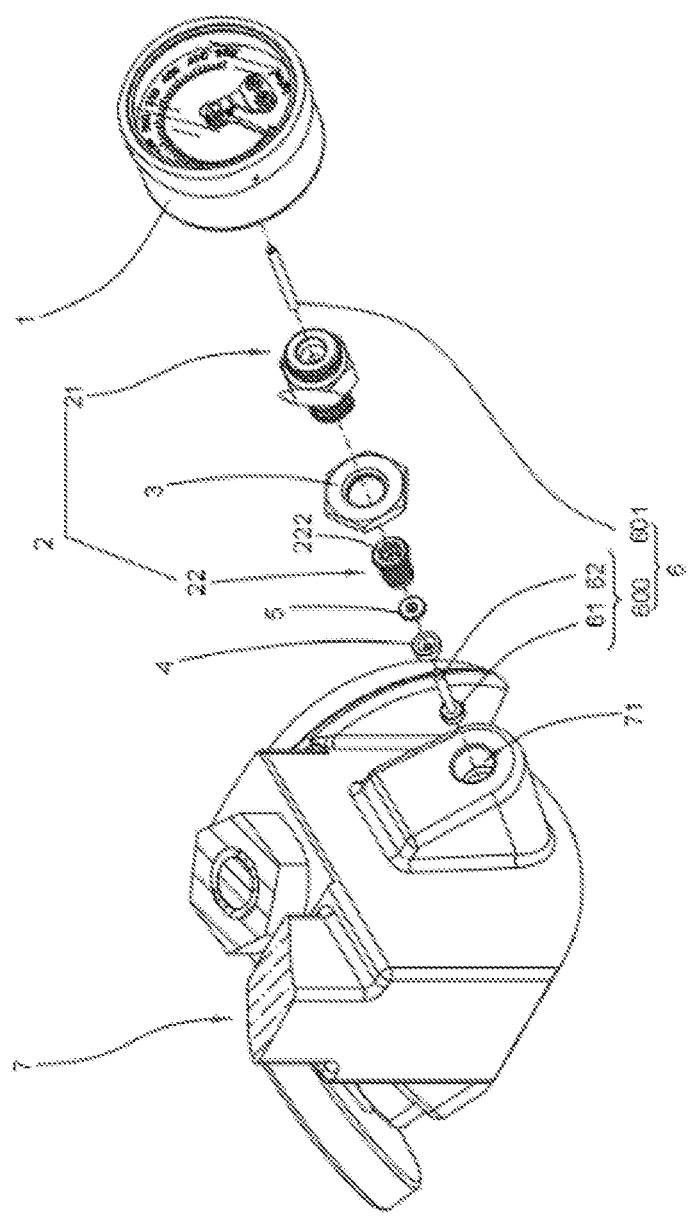
FIG. 5 is a structural perspective view of a further embodiment of a pressure measuring instrument according to the present disclosure.
Figure 6:
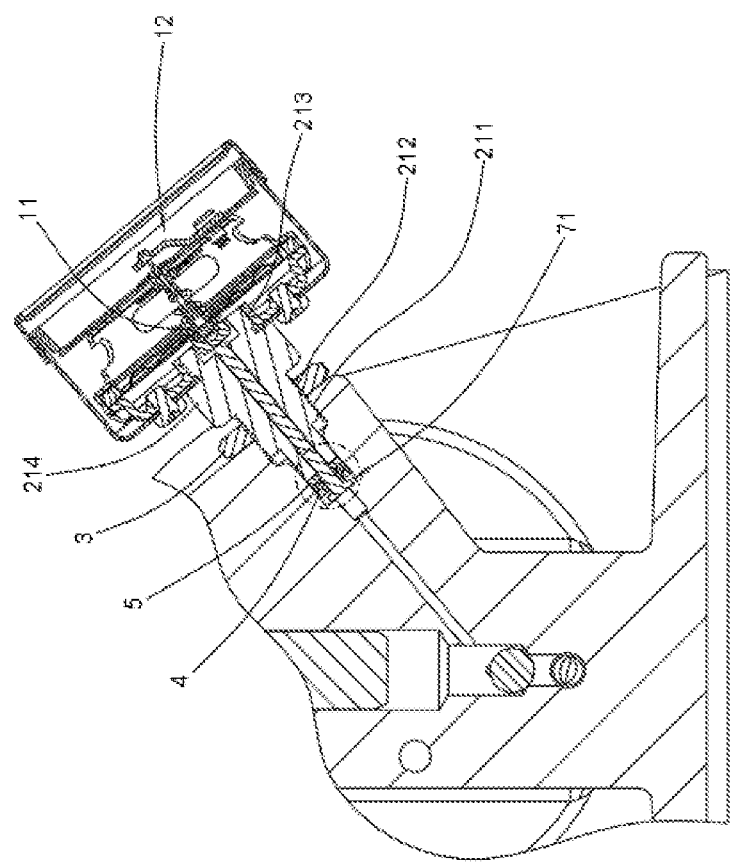
FIG. 6 is a sectional view of an embodiment of a pressure measuring instrument according to the present disclosure.
Figure 7:
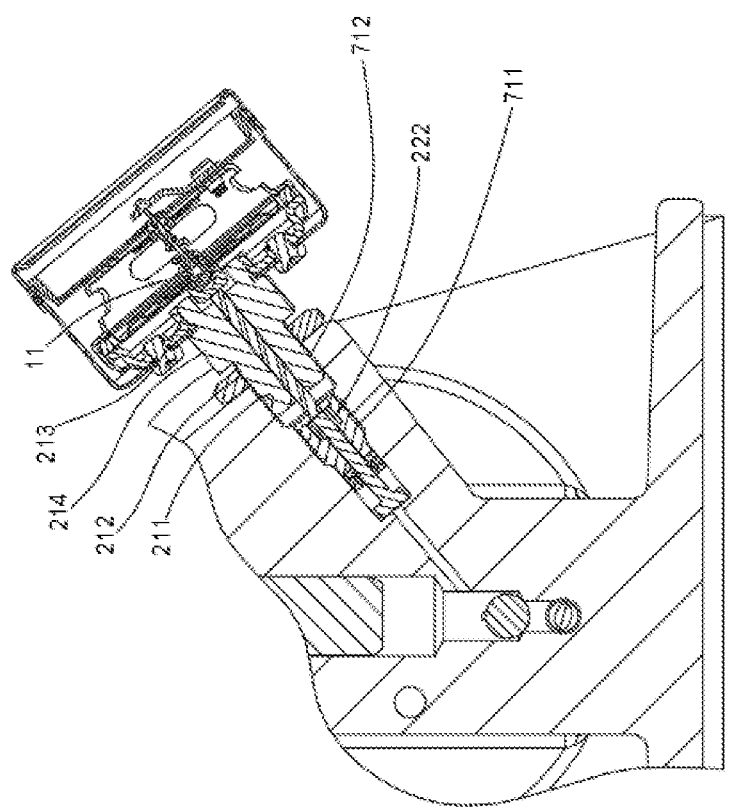
FIG. 7 is a sectional view of another embodiment of a pressure measuring instrument according to the present disclosure.
Figure 8:
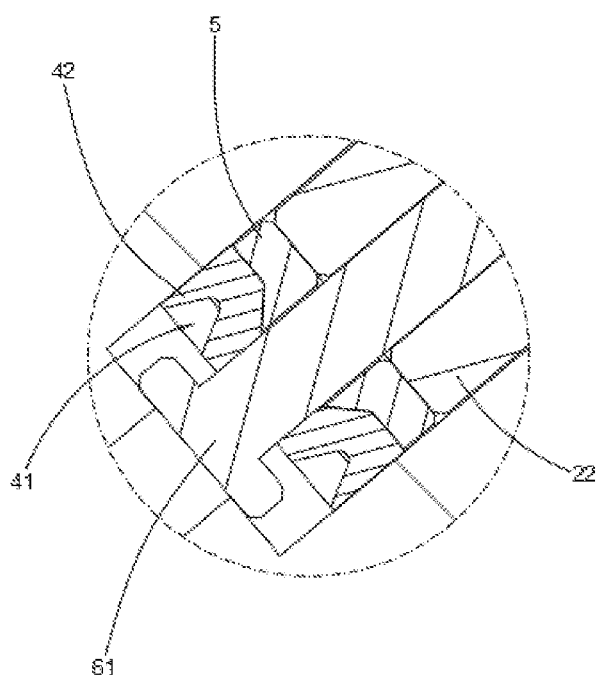
FIG. 8 is a partial enlarged view shown in FIG. 6 according to the present disclosure.

As shown in FIGS. 1-8, an embodiment of the present disclosure provides a pressure measuring instrument, which includes a gauge body 1 and a connecting component 2.

The connecting component 2 includes a first connecting member 21, a positioning sleeve 3, and a pushing component 6, wherein the first connecting member 21 is connected with the gauge body 1 to form a corotating relationship, and the first connecting member 21 includes a first external thread section 211 and a second external thread section 212 which are connected, and the first external thread section 211 is used for a pressure-measuring hole 71 threaded with a pressure vessel 7, the second external thread section 212 protrudes from the pressure-measuring hole 71, the positioning sleeve 3 is rotatably screwed to the second external thread section 212, and the positioning sleeve 3 is configured to provide a force to the pressure vessel 7.

In this embodiment, the positioning sleeve 3 is a nut which presses directly against the pressure vessel 7 to provide a function of positioning the first connecting member 21, in detail, during installation, the first connecting member 21 is screwed to the pressure vessel 7 through the first external thread section 211, and the gauge body 1 corotates with the first connecting member 21 relative to the pressure vessel 7. After the first external thread section 211 is inserted into the pressure-measuring hole 71 to a certain depth, the user turns the first connecting member 21 to fine adjust the surface of the gauge body 1 to a desired position, and then the positioning sleeve 3 is rotated to press against the pressure vessel 7, so that an effective and stable connection can be achieved and the surface of the gauge body 1 is positively aligned. In more detail, the design of the positioning sleeve 3 can provide a positioning force at any rotational position, and can effectively avoid a problem that the surface of the gauge body 1 cannot be aligned to the desired position after the first connecting member 21 is locked which is caused by manufacturing errors of an internal thread section of the pressure-measuring hole 71.

The gauge body 1 includes a pressurized unit 11 and a rotating needle unit 12 connected to each other in a couple relationship, and the pushing component 6 is movably passed through the first connecting member 21 to push the pressurized unit 11, and then the rotating needle unit 12 rotates according to a pressure received by the pressurized unit 11, specifically, a fluid in the pressure vessel 7 drives the pushing component 6 to push against the pressurized unit 11 in the pressure-measuring hole 71, and the pressurized unit 11 receives a pressure to rotate in conjunction with the rotating needle unit 12, and a fluid pressure is clearly expressed in numerical form.

More specifically, the pushing component 6 includes a head portion 61, a body portion 62 and a tail portion 63 connected to each other, wherein the tail portion 63 is configured to push against the pressurized unit 11, and the body portion 62 is configured to pass through the first connecting member 21, and a radial size of the head portion 61 is greater than a radial size of the body portion 62 so as to have more contact area for contacting with the fluid to achieve a movement under an average force.

In this embodiment, the first connecting member 21 further includes a third external thread section 213, the gauge body 1 is detachably screwed to the third thread section 213, and the gauge body 1 having different modes can be replaced by a user according to requirements; wherein, the gauge body 1 and the first connecting member 21 are arranged coaxially in order to be rotated and adjusted to the desired position. The first connecting member 21 further includes an expansion section 214 disposed between the second external thread section 212 and the third external thread section 213, and the expansion section 214 abuts and supports the gauge body 1 in an axial direction, so that the gauge body 1 can withstand an impact of unexpected external force.

Preferably, the connecting component 2 further includes a leakage-stopping member 4 sleeved on the pushing component 6, and the leakage-stopping member 4 laterally abuts against a hole wall of the pressure-measuring hole 71 to prevent fluid leakage. Moreover, one side of the leakage-stopping member 4 is recessed with an annular groove 41 for receiving the fluid of the pressure vessel 7, and an outer groove wall 42 of the annular groove 41 is stressed to be radially pressed against the hole wall of the pressure-measuring hole 71, so that the outer groove wall 42 can more closely adhere to the hole wall of the pressure-measuring hole 71 under an increasing pressure.

Also preferably, the connecting component 2 further includes a supporting member 5, the supporting member 5 and the leakage-stopping member 4 are engaged with each other, a hardness of the supporting member 5 is greater than a hardness of the leakage-stopping member 4, and the supporting member 5 provides an axial support force for the leakage-stopping member 4 to improve an positional stability of the leakage-stopping member 4 and support the leakage-stopping member 4 without axial deformation; wherein, the supporting member 5 abuts against the second connecting member 22 to form a continuous abutting support structure.

Embodiment 2

As shown in FIGS. 1-8, an embodiment of the present disclosure provides a pressure measuring instrument, which includes a gauge body 1 and a connecting component 2.

The connecting component 2 includes a first connecting member 21, a positioning sleeve 3, and a pushing component 6, wherein the first connecting member 21 is connected with the gauge body 1 to form a corotating relationship, and the first connecting member 21 includes a first external thread section 211 and a second external thread section 212 which are connected, and the first external thread section 211 is used for a pressure-measuring hole 71 threaded with a pressure vessel 7, the second external thread section 212 protrudes from the pressure-measuring hole 71, the positioning sleeve 3 is rotatably screwed to the second external thread section 212, and the positioning sleeve 3 is used to provide a force to the pressure vessel 7.

It should be noted that the connecting component 2 is different from a traditional single component, but adopts two separate components, wherein the second connecting component 22 is first screwed to the pressure-measuring hole 71, and the second connecting member 22 is configured to stop and withstand a pressure of an internal fluid, so that the first connecting member 21 is not squeezed by the pressure, and thus it is further ensured that when the first connecting member 21 and the gauge body 1 are subjected to unexpected impacts, the internal fluid will not leak out due to shaking and generation of gaps, and it can also effectively prevent the first connecting member 21 and the gauge body 1 are ejected in a reverse direction due to internal pressure.

More specifically, the second connecting member 22 is embedded in the pressure-measuring hole 71, and the second connecting member 22 is not loosened by any external force, and thus the second connecting member 22 can be stably positioned in the pressure-measuring hole 71. The second connecting member 22 is configured to divide the pressure-measuring hole 71 into a fluid pressure area and a fluid pressure-free area, and the first connecting member 21 and the second screw connection section 712 are located in the fluid pressure-free area, so that a user can rotate and remove the first connecting member 21 at any time without worrying about the outflow of the internal fluid, and the user can replace the first connecting member 21 and the gauge body 1 with confidence.

Preferably, the second connecting member 22 includes a driving portion 222 for allowing a manual tool assembled rod, such as but not limited to a tool assembled rod, to penetrate into the pressure-measuring hole 71.

Also preferably, an outer diameter of the first connecting member 21 is larger than an outer diameter of the second connecting member 22 in order to increase a bonding strength between the first connecting member 21 and the pressure vessel 7.

In this embodiment, the positioning sleeve 3 is a nut which presses directly against the pressure vessel 7 to provide a function of positioning the first connecting member 21, in detail, during installation, the first connecting member 21 is screwed to the pressure vessel 7 through the first external thread section 211, and the gauge body 1 corotates with the first connecting member 21 relative to the pressure vessel 7. After the first external thread section 211 is inserted into the pressure-measuring hole 71 to a certain depth, the user turns the first connecting member 21 to fine adjust the surface of the gauge body 1 to a desired position, and then the positioning sleeve 3 is rotated to press against the pressure vessel 7, so that an effective and stable connection can be achieved and the surface of the gauge body 1 is positively aligned. In more detail, the design of the positioning sleeve 3 can provide a positioning force at any rotational position, and can effectively avoid a problem that the surface of the gauge body 1 cannot be aligned to the desired position after the first connecting member 21 is locked which is caused by manufacturing errors of an internal thread section of the pressure-measuring hole 71.

The gauge body 1 includes a pressurized unit 11 and a rotating needle unit 12 connected to each other in a couple relationship, and the pushing component 6 is movably disposed through the first connecting member 21 to push the pressurized unit 11, and then the rotating needle unit 12 rotates according to a pressure received by the pressurized unit 11, specifically, a fluid in the pressure vessel 7 drives the pushing component 6 to push against the pressurized unit 11 in the pressure-measuring hole 71, and the pressurized unit 11 withstands a pressure to rotate in conjunction with the rotating needle unit 12, and a fluid pressure is clearly expressed in numerical form.

More specifically, the pushing component 6 includes a head portion 61, a body portion 62 and a tail portion 63 connected to each other, wherein the tail portion 63 is used for pushing the pressurized unit 11, and the body portion 62 is used for passing through the first connecting member 21, and a radial size of the head portion 61 is greater than a radial size of the body portion 62 so as to have more contact area for contacting with the fluid to achieve a movement under an average force.

In this embodiment, the first connecting member 21 further includes a third external thread section 213, the gauge body 1 is detachably screwed to the third thread section 213, and the gauge body 1 having different modes can be replaced by a user according to requirements; wherein, the gauge body 1 and the first connecting member 21 are arranged coaxially in order to be rotated and adjusted to the desired position. The first connecting member 21 further includes an expansion section 214 disposed between the second external thread section 212 and the third external thread section 213, and the expansion section 214 abuts and supports the gauge body 1 in an axial direction, so that the gauge body 1 can withstand an impact of unexpected external force.

Preferably, the connecting component 2 further includes a leakage-stopping member 4 sleeved on the pushing component 6, and the leakage-stopping member 4 laterally abuts against a hole wall of the pressure-measuring hole 71 to prevent fluid leakage. Moreover, one side of the leakage-stopping member 4 is recessed with an annular groove 41 for receiving the fluid of the pressure vessel 7, and an outer groove wall 42 of the annular groove 41 is stressed to be radially pressed against the hole wall of the pressure-measuring hole 71, so that the outer groove wall 42 can more closely adhere to the hole wall of the pressure-measuring hole 71 under an increasing pressure.

Also preferably, the connecting component 2 further includes a supporting member 5, the supporting member 5 and the leakage-stopping member 4 are engaged with each other, a hardness of the supporting member 5 is greater than a hardness of the leakage-stopping member 4, and the supporting member 5 provides an axial support force for the leakage-stopping member 4 to improve an positional stability of the leakage-stopping member 4 and support the leakage-stopping member 4 without axial deformation; wherein, the supporting member 5 abuts against the second connecting member 22 and the leakage-stopping member 4 to form a continuous abutting support structure.

Embodiment 3

As shown in FIGS. 1-8, the pressure measuring instrument of the present disclosure is applied to a pressure vessel 7, the pressure vessel 7 includes a pressure-measuring hole 71, and a first screw connection section 711 and a second screw connection section 712 which are formed on the hole wall of the pressure-measuring hole 71, wherein the first screw connection section 711 is farther away from an opening of the pressure-measuring hole 71 than the second screw connection section 712. The pressure measuring instrument includes a gauge body 1, a connecting component 2, and a pushing component 6.

The gauge body 1 includes a pressurized unit 11, the connecting component 2 includes a first connecting member 21 and a second connecting member 22, and the second connecting member 22 is screwed to the first screw connection section 711, the first connecting member 21 is screwed to the second screw connection section 712 and connected to the gauge body 1, and the pushing component 6 is movably disposed through the connecting assembly 2. The pushing assembly 6 is pushed by the fluid in the pressure-measuring hole 71 to push the pressurized unit 11 of the gauge body 1, so that the gauge body 1 can convert the received pressure into a numerical value for the user to know the pressure in the pressure vessel 7.

It should be noted that the connecting component 2 is different from a traditional single component, but adopts two separate components, wherein the second connecting component 22 is first screwed to the pressure-measuring hole 71, and the second connecting member 22 is configured to stop and withstand a pressure of an internal fluid, so that the first connecting member 21 is not squeezed by the pressure, and thus it is further ensured that when the first connecting member 21 and the gauge body 1 are subjected to unexpected impacts, the internal fluid will not leak out due to shaking and generation of gaps, and it can also effectively prevent the first connecting member 21 and the gauge body 1 are ejected in a reverse direction due to internal pressure.

More specifically, the second connecting member 22 is embedded in the pressure-measuring hole 71, and the second connecting member 22 is not loosened by any external force, and thus the second connecting member 22 can be stably positioned in the pressure-measuring hole 71. The second connecting member 22 is configured to divide the pressure-measuring hole 71 into a fluid pressure area and a fluid pressure-free area, and the first connecting member 21 and the second screw connection section 712 are located in the fluid pressure-free area, so that a user can rotate and remove the first connecting member 21 at any time without worrying about the outflow of the internal fluid, and the user can replace the first connecting member 21 and the gauge body 1 with confidence.

Preferably, the second connecting member 22 includes a driving portion 222 for allowing a manual tool assembled rod, such as but not limited to a tool assembled rod, to penetrate into the pressure-measuring hole 71.

Also preferably, an outer diameter of the first connecting member 21 is larger than an outer diameter of the second connecting member 22 in order to increase a bonding strength between the first connecting member 21 and the pressure vessel 7.

The connecting component 2 further includes a positioning sleeve 3, the first connecting member 21 includes a first external thread section 211 and a second external thread section 212 connected to each other, and the first external thread section 211 is screwed to the second screw connection section 712, the second external thread section 212 protrudes from the pressure-measuring hole 71, the positioning sleeve 3 is rotatably screwed to the second external thread section 212, and the positioning sleeve 3 is configured to provide a force to the pressure vessel 7.

In detail, the gauge body 1 corotates with the first connecting member 21 relative to the pressure vessel 7, and when the first external thread section 211 is inserted into the pressure-measuring hole 71 to a certain depth, the first connecting member 21 is rotated by the user for fine adjustment in order to align the surface of the gauge body 1 to a desired position, and then the positioning sleeve 3 is rotated to press against the pressure vessel 7, so that an effective and stable connection can be achieved and the surface of the gauge body 1 is positively aligned.

In this embodiment, the positioning sleeve 3 is a nut which presses directly against the pressure vessel 7 to provide a function of positioning the first connecting member 21. In addition, the first connecting member 21 further includes a third external thread section 213 and an expansion section 214, and the gauge body 1 is detachably screwed to the third thread section 213. The expansion section 214 is disposed between the second external thread section 212 and the third external thread section 213, and the expansion section 214 supports the gauge body 1 in an axial direction so that the gauge body 1 can withstand an impact of unexpected external force.

The connecting component 2 further includes a leakage-stopping member 4 sleeved on the pushing component 6, and the leakage-stopping member 4 laterally abuts against a hole wall of the pressure-measuring hole 71 to prevent fluid leakage. Moreover, one side of the leakage-stopping member 4 is recessed with an annular groove 41 for receiving the fluid of the pressure vessel 7, and an outer groove wall 42 of the annular groove 41 is stressed to be radially pressed against the hole wall of the pressure-measuring hole 71, so that the outer groove wall 42 can more closely adhere to the hole wall of the pressure-measuring hole 71 under an increasing pressure.

The connecting component 2 further includes a supporting member 5, the supporting member 5 and the leakage-stopping member 4 are engaged with each other, a hardness of the supporting member 5 is greater than a hardness of the leakage-stopping member 4, and the supporting member 5 provides an axial support force for the leakage-stopping member 4 to improve an positional stability of the leakage-stopping member 4 and support the leakage-stopping member 4 without axial deformation; wherein, the supporting member 5 abuts against the second connecting member 22 and the leakage-stopping member 4 to form a continuous abutting support structure.

The pushing component 6 includes a first pushing rod 600 and a second pushing rod 601, and the second pushing rod 601 is movably passed through the first connecting member 21 to push the pressurized unit 11, and the first pushing rod 600 is movably passed through the second connecting member 22 to push the second pushing rod 601, and a portion of the first pushing rod 600 protrudes from the second connecting member 22.

In this embodiment, the first pushing rod 600 includes a head portion 61 and a body portion 62 connected to each other, and the body portion 62 is used for passing through the second connecting member 22 to push the second pushing rod 601, and the head portion 61 protrudes from the second connecting member 22; wherein a radial size of the head portion 61 is greater than a radial size of the body portion 62.

It should be understood that, in other embodiments, the first pushing rod 600 and the second pushing rod 601 may be continuously integrated.

Although embodiments of the present disclosure have been shown and described, those ordinary skilled in the art can understand that various changes, variations, substitutions and modifications may be made to these embodiments without departing from the principle and spirit of the present disclosure, and the scope of present disclosure is defined by the appended claims and their equivalents.

What is claimed is:

1. A pressure measuring instrument for a pressure vessel comprising a pressure-measuring hole, a hole wall of the pressure-measuring hole being provided with a first screw connection section and a second screw connection section, and the first screw connection section being farther away from an opening of the pressure-measuring hole than the second screw connection section, wherein the pressure measuring instrument comprises a gauge body, a connecting component and a pushing component, the connecting component comprises a first connecting member and a positioning sleeve which are connected with each other to form a corotating relationship, and the first connecting member comprises a first external thread section and a second external thread section connected to each other, and the first external thread section is used for a pressure-measuring hole threaded with a pressure vessel, the second external thread section protrudes from the pressure-measuring hole, the positioning sleeve is rotatably screwed to the second external thread section, and the positioning sleeve is configured to provide a force to the pressure vessel, and the pushing component is configured to pass through the connecting component and be pushed by a fluid in the pressure-measuring hole to push against a pressurize unit of the gauge body.

2. The pressure measuring instrument according to claim 1, wherein the gauge body comprises a pressurized unit and a rotating needle unit connected to each other in a couple relationship, and the pushing component is movably passed through the first connecting member to push the pressurized unit, and then the rotating needle unit rotates according to a pressure received by the pressurized unit.

3. The pressure measuring instrument according to claim 2, wherein the connecting component further comprises a leakage-stopping member sleeved on the pushing component, and the leakage-stopping member laterally abuts against a hole wall of the pressure-measuring hole.

4. The pressure measuring instrument according to claim 3, wherein one side of the leakage-stopping member is recessed with an annular groove for receiving the fluid of the pressure vessel, and an outer groove wall of the annular groove is stressed to be radially pressed against the hole wall of the pressure-measuring hole.

5. The pressure measuring instrument according to claim 4, wherein the connecting component further comprises a supporting member, the supporting member and the leakage-stopping member are engaged with each other, and the supporting member provides an axial support force for the leakage-stopping member.

6. The pressure measuring instrument according to claim 5, wherein a hardness of the supporting member is greater than a hardness of the leakage-stopping member.

7. The pressure measuring instrument according to claim 6, wherein the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

8. The pressure measuring instrument according to claim 5, wherein the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

9. The pressure measuring instrument according to claim 4, wherein the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

10. The pressure measuring instrument according to claim 3, wherein the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

11. The pressure measuring instrument according to claim 10, wherein an outer diameter of the first connecting member is larger than an outer diameter of the second connecting member.

12. The pressure measuring instrument according to claim 2, wherein the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

13. The pressure measuring instrument according to claim 12, wherein the second connecting member comprises a driving portion for allowing a manual tool assembled rod to penetrate into the pressure-measuring hole.

14. The pressure measuring instrument according to claim 1, wherein the first connecting member further comprises a third external thread section, the gauge body is detachably screwed to the third thread section; and the first connecting member further comprises an expansion section disposed between the second external thread section and the third external thread section, and the expansion section abuts and supports the gauge body in an axial direction.

15. The pressure measuring instrument according to claim 14, wherein the connecting component further comprises a second connecting member which is screwed to a first screw connection section in the pressure-measuring hole of the pressure vessel, and the first connecting member is screwed to a second screw connection section in the pressure-measuring hole of the pressure vessel and connected to the gauge body.

16. The pressure measuring instrument according to claim 14, wherein the pushing component comprises a head portion, a body portion and a tail portion connected to each other, the tail portion is configured to push against the pressurized unit, the body portion is configured to pass through the connecting component, and a radial size of the head portion is greater than a radial size of the body portion.

17. The pressure measuring instrument according to claim 14, wherein the pushing component comprises a first pushing rod and a second pushing rod, and the second pushing rod is movably passed through the first connecting member to push the pressurized unit, and the first pushing rod is movably passed through the second connecting member to push the second pushing rod, and a portion of the first pushing rod protrudes from the second connecting member, and the first pushing rod comprises a head portion and a body portion connected to each other, the first pushing rod is configured to push the second pushing rod and push against the pressurized unit with the second pushing rod.

* * * * *